United States Patent [19]

Moldenhauer et al.

[11] 3,970,372

[45] July 20, 1976

[54] MOTOR DRIVEN LIGHT CHOPPER

[75] Inventors: Kurt Moldenhauer, Frankfurt am Main; Heinrich Stolz, Muhlheim am Main, both of Germany

[73] Assignee: Hartmann & Braun Aktiengesellschaft, Frankfurt am Main, Germany

[22] Filed: Jan. 15, 1975

[21] Appl. No.: 541,135

[30] Foreign Application Priority Data

Jan. 22, 1974 Germany.......................... 2402865

[52] U.S. Cl................................. 350/274; 250/233
[51] Int. Cl.²....................................... G05D 25/00
[58] Field of Search................... 350/266, 273–275; 250/343–345, 232, 233; 356/51

[56] References Cited

UNITED STATES PATENTS 3,729,264  4/1973  Simazaki............................ 350/274

Primary Examiner—John K. Corbin
Assistant Examiner—F. L. Evans
Attorney, Agent, or Firm—Ralf H. Siegemund

[57] ABSTRACT

A motor driven light chopper has a cylindrical motor casing with annular stator and rotor and windows in the end faces of the casing with cross bars serving for journalling the rotor shaft which is connected to the rotor by a single spoke. The light chopping diaphragm is releasibly secured to the shaft, on the outside of the casing so that one shutter blade or the like shades the spoke.

3 Claims, 2 Drawing Figures

MOTOR DRIVEN LIGHT CHOPPER

BACKGROUND OF THE INVENTION

The present invention relates to a light chopper for photometric instruments, and more particularly, the invention relates to improvements in motor driven diaphragms serving for periodically interrupting one or several beams of light.

Light choppers of the type outlined above are used for example in two beam photometers having two beams of radiation respectively traversing fluid filled reference and measuring chambers. The motor driven chopper interrupts the two beams to obtain an intensity modulation serving so to speak as a carrier signal which is amplitude modulated by absorption in the chambers.

The selection of the motor for driving such a chopper diaphragm is quite important. One usually prefers self-starting synchronous motors for various reasons. The diaphragm should sit directly on the motor shaft, without interpositioning of any transmission or coupling in order to obtain a quiet and steady run. The shaft should be short, so as to avoid additional bearing support outside of the motor. For the same reason one should use a rather flat motor casing.

The motor must exhibit sufficient torque particularly for starting, and particularly because just one motor driven diaphragm is to be used for both beams in such a two beam photometer. These beams are usually spaced apart by a considerable distance, so that the diameter of the chopper diaphragm is large accordingly. The torque of the motor increases of course with the diameter thereof.

The German printed patent application No. 2,132,973 describes a rather advantageously constructed light chopper, though not for two beam photometers, whose motor has a cylindrical rotor with a cover extending transversely to the direction of light as emitted by a source. The motor casing has a parallelly extending cover, and both covers have windows whereby the rotation of the rotor cover provides the light chopping function. See also the company brochure FA 55090b of March, 1963 (Motortype SSL) of AEG.

Generally speaking, two beam photometers can operate with in-phase or 180°-out-of-phase chopping of the two beams. In either case the diaphragm is usually of winged construction or one uses a multi-aperture disk. It may be necessary in cases to change from one type of diaphragm to another one. If one uses the construction outlined in the preceding paragraph, the motor casing has to be opened and the rotating disk has to be removed and the new one with a different shutter pattern will be fastened to the shaft. One could have several motors available with different types of light chopping diaphragms, but that would require a large inventory.

DESCRIPTION OF THE INVENTION

It is an object of the present invention to provide for a new and improved motor driven light chopper obviating the deficiencies outlined above.

It is a particular object of the present invention to improve motor driven light choppers having a disk-shaped or a cylindrical rotor and a motor casing with openings for permitting the passage of light.

In accordance with the preferred embodiment of the invention, the motor for driving a light chopper is to be of apertured construction including axially aligned windows in a casing to permit passage of light. The rotor of that motor is to be annular with a central opening and being held by a spoke on a centrally journalled shaft. The chopper is disposed on that shaft but outside of the casing. Preferably, the chopper is easily removably mounted on the shaft. The motor casing is preferably a flat cylinder with axially aligned openings of the end faces each traversed by a flat bar in which the shaft is journalled. While more than one spoke could be used to hold the rotor, a single one is preferred to obtain larger versatility for reasons developed more fully below. It is, however, necessary to make special provisions for balancing the rotor.

DESCRIPTION OF THE DRAWING

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
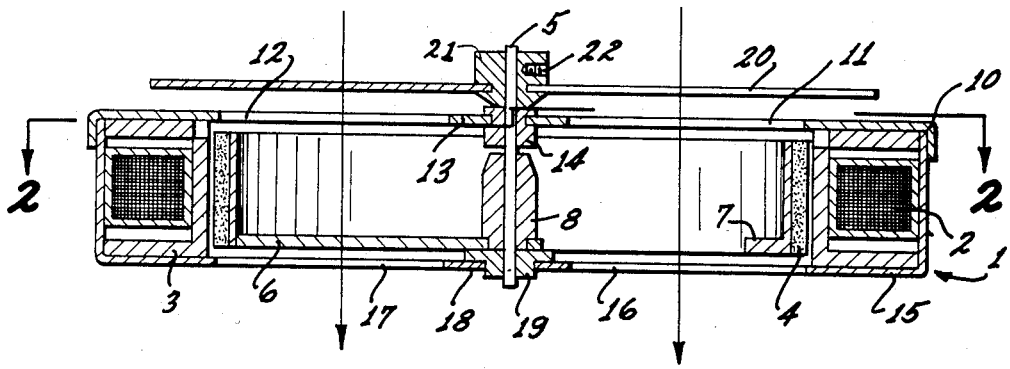
FIG. 1 is an axial section view through a motor driven light chopper constructed in accordance with the preferred embodiment of the invention.

Proceeding now to the detailed description of the drawings, the figures show a flat cylindrical motor-driven casing 1 which holds a stator construction as shown for example in U.S. Letters Pat. No. 2,981,855 for a synchronous motor. The stator has an annular coil 2 and poles 3, and short circuit rings made of copper establish a rotating field in a manner known per se.

The rotor 4 of this motor is constructed as an annulus or ring with narrow radial dimensions and made of iron with large hysteresis loop, so that synchronous rotation results from the rotating magnetic field as set up by the poles and from the hysteresis properties of that rotor ring.

The motor casing 1 is constructed of a flat dish-like element 15 with a bottom traversed by two openings 16 and 17, separated from each other by a flat cross-bar 18. One can also say that the cylindrical casing bottom has an axial end with a circular opening which is divided by the cross bar 18 to obtain two windows 16 and 17.

Figure 2:
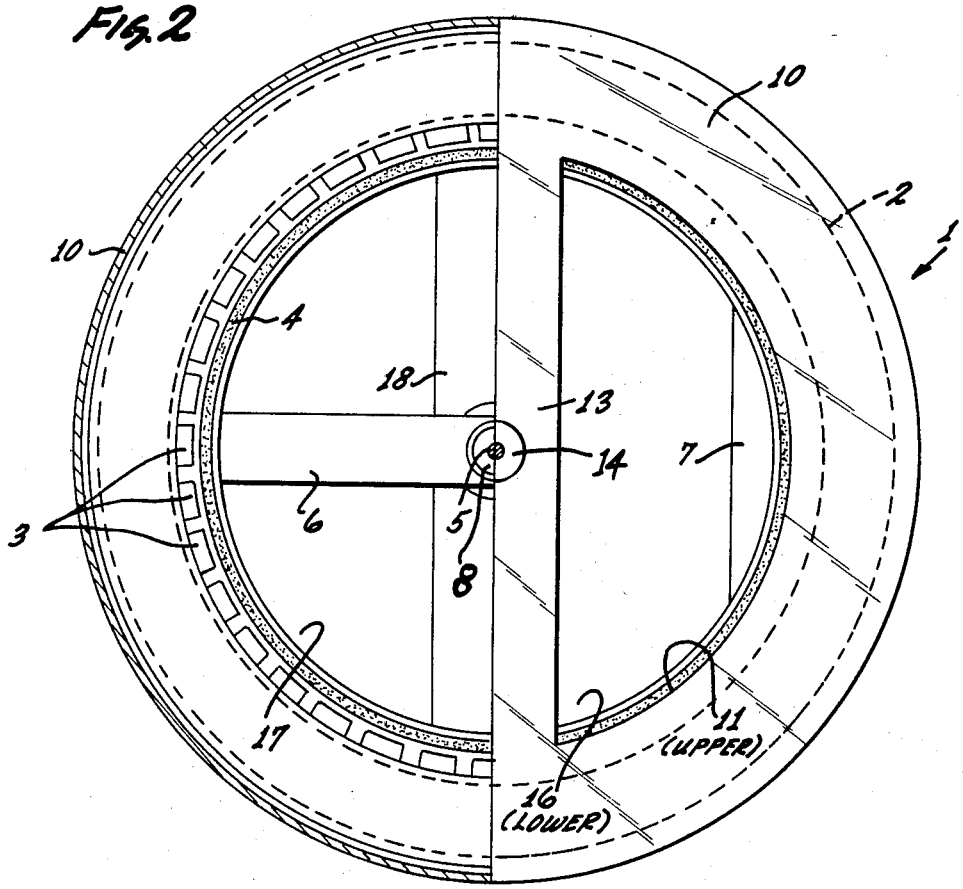
FIG. 2 is a section view along line 2—2 in FIG. 1.

The casing 1 has a cover or top part 10, being the other end face of the cylindrical casing, and having likewise two windows, 11 and 12, separated from each other by a flat cross bar 13. The two windows 11 and 16 are aligned in axial direction; so are windows 12 and 17. Also, bars 13 and 18 are aligned in axial direction. Since the section plane for FIG. 2 is shifted in axial direction in the center, both bars 13 and 18, are directly visible in FIG. 2.

The motor includes a shaft 5 which is as short as the axial dimensions of rotor and stator permit. The shaft 5 is journalled in two bearing blocks of suitable construction, 14 and 19. The bearings are mounted respectively in the flat bars 13 and 18. In addition, the shaft 5 has an internal hub element 8 which is connected to a single, flat spoke element 6 by means of which annulus 4 is concentrically secured to shaft 5 and hub 8.

The single spoke element 6 introduces a certain eccentricity and imbalance which is offset and counterbalanced by a ridge 7.

Shaft 5 projects through the bearings 14 and carries a hub element 21 on the outside of apertured cover 10. A diaphragm 20 with one or more shutter blades, wings, or the like is carried by hub element 21 which is secured to shaft 5 by a set screw 22. The diaphragm construction is not of immediate relevancy for the invention. It has plural azimuthally spaced apart wings. It is, however, important that the hub plus diaphragm can be easily removed for replacing it by one with a different wing or shutter pattern.

The arrows in FIG. 1 denote one possibility for the direction of two beams of radiation. They are both oriented to pass respectively through the axially aligned window pairs 11, 16 and 12, 17. The light is chopped in accordance with the particular configuration of the diaphragm 20. The direction of light could, of course, be reversed as it is basically of no consequence whether the light is chopped before or after passage through the motor casing.

The diaphragm is secured to the shaft, so that one wing, radial ridge or the like is axially aligned with spoke 6, so that the spoke 6 is shaded by the diaphragm and does not obscure any light path.

One can see now also the reason for the utilization of a single spoke element for holding the annular rotor. If the unit is to be used as chopper in a two-beam instrument, the possibility of out-of-phase chopping must be provided for. Since one of the shutter wings is to be axially aligned with spoke 6, the radial opposite region in the interior of annular rotor 4 must not be obscured by a spoke. The cross section hatching in FIG. 1 represents that situation showing particularly a blade portion aligned with spoke 6 and a window portion of the diaphragm in radial, 180° out-of-phase alignment.

It follows from the foregoing, that any second spoke will to some extent limit the universality of the unit and pose a limitation on available shutter or wing patterns. Of course, one needs one spoke, but that is no limitation as there will always be at least one shutter blade.

The invention is not limited to the embodiments described above, but all changes and modifications thereof not constituting departures from the spirit and scope of the invention are intended to be included.

We claim:
1. A motor-driven light chopper comprising:
   a flat motor casing with top and bottom end faces, each having at least one window, the windows being axially aligned and having axially aligned means for journalling a shaft;
   the shaft being journalled in said casing, but projecting from said casing;
   a light chopping diaphragm disposed outside of said casing and mounted on said shaft where projecting from said casing;
   an annular stator construction in said casing;
   an annular rotor in said casing having a central opening to permit passage of light as passing through said aligned windows; and
   having disposition to be shaded by the diaphragm at least one spoke element traversing said central opening for connecting said shaft to said annular rotor.

2. A motor-driven light chopper as in claim 1 wherein the rotor is mounted to the shaft by a single spoke element being said one spoke element; and means to balance the rotor.

3. A motor-driven light chopper as in claim 1, wherein the casing top and bottom end faces each has two windows separated respectively by axially aligned bars, the shaft being journalled in said bars.

* * * * *